(12) United States Patent
Tsuyuki

(10) Patent No.: US 8,626,445 B2
(45) Date of Patent: Jan. 7, 2014

(54) NAVIGATION DEVICE

(76) Inventor: Toshio Tsuyuki, Kanagawa (JP)

( * ) Notice: Subject to any disclaimer, the term of this patent is extended or adjusted under 35 U.S.C. 154(b) by 0 days.

(21) Appl. No.: 13/642,895

(22) PCT Filed: Apr. 19, 2011

(86) PCT No.: PCT/JP2011/060002
§ 371 (c)(1),
(2), (4) Date: Dec. 21, 2012

(87) PCT Pub. No.: WO2011/132792
PCT Pub. Date: Oct. 27, 2011

(65) Prior Publication Data
US 2013/0090852 A1 Apr. 11, 2013

(30) Foreign Application Priority Data

| Apr. 23, 2010 | (JP) | 2010-112614 |
| May 6, 2010 | (JP) | 2010-117760 |
| Jun. 25, 2010 | (JP) | 2010-158278 |
| Jun. 25, 2010 | (JP) | 2010-158279 |
| Jun. 25, 2010 | (JP) | 2010-158280 |

(51) Int. Cl.
*G01C 21/34* (2006.01)

(52) U.S. Cl.
USPC ............ 701/540; 701/533; 701/532; 701/538

(58) Field of Classification Search
CPC ........ G01C 21/36; G01C 21/34; G09B 29/00; G09B 29/10; G09G 3/20; G09G 5/36

USPC ......... 701/400, 408, 409, 410, 428, 429, 431, 701/467, 527, 532, 533, 538, 302
See application file for complete search history.

(56) References Cited

U.S. PATENT DOCUMENTS

| 5,467,276 A | * | 11/1995 | Tsuyuki | 701/410 |
| 5,557,522 A | | 9/1996 | Nakayama et al. | |
| 5,675,492 A | * | 10/1997 | Tsuyuki | 701/418 |
| 6,118,389 A | | 9/2000 | Kamada et al. | |
| 7,328,101 B2 | * | 2/2008 | Ishikawa et al. | 701/540 |
| 2006/0080034 A1 | * | 4/2006 | Hayashi | 701/211 |

FOREIGN PATENT DOCUMENTS

| JP | 07-83675 A | 3/1995 |
| JP | 08-233589 A | 9/1996 |
| JP | 11-83514 A | 3/1999 |
| JP | 11-183188 A | 7/1999 |

OTHER PUBLICATIONS

International Search Report of the International Searching Authority mailed Aug. 2, 2011 for the corresponding international application No. PCT/JP2011/060002 (with English translation).

* cited by examiner

*Primary Examiner* — Helal A Algahaim
*Assistant Examiner* — Genna Mott
(74) *Attorney, Agent, or Firm* — Evans & Molinelli PLLC; Eugene J. Molinelli

(57) ABSTRACT

End lines are ingeniously displayed so as to enhance the function of reaching a target without impairing safety. Visibility is improved and the driver is assisted to select a route, so that reaching a target is ensured. At the same time, the driver's burden is reduced and thereby safety is enhanced.

1 Claim, 1 Drawing Sheet

NAVIGATION DEVICE

CROSS REFERENCE TO RELATED APPLICATIONS

This application is a U.S. national stage application of PCT/JP2011/060002 filed on Apr. 19, 2011, and claims priority to, and incorporates by reference, Japanese Patent Applications No. 2010-112614 filed on Apr. 23, 2010, No. 2010-117760 filed on May 6, 2010, No. 2010-158278 filed on Jun. 25, 2010, No. 2010-158279 filed on Jun. 25, 2010, and No 2010-158280 filed on Jun. 25, 2010.

TECHNICAL FIELD

The present invention relates to a navigation device to be used for mobile objects.

BACKGROUND

Due to restriction on safety issues, etc., the object of reaching a target point has not been attained in the conventional art.

SUMMARY

Object to be Attained by the Invention

An object is to improve a capability of reaching a target point while ensuring safety.

Means to Attain the Object

A path reaching to a target point is displayed as an end line 1, a path reaching to the end line 1 as an end line 2 and a path reaching to an end line 'n' as an end line 'n+1' sequentially.

Each end line is displayed ingeniously so as to enhance the effect.

Effect of the Invention

A function of reaching a target point is improved without impairing safety.

MODE FOR CARRYING OUT THE INVENTION

While eliminating the danger resulting from map display and navigation, a path reaching to a target point and a path reaching to that path are displayed sequentially and the line display is changed in accordance with the moving surround.

DETAILED DESCRIPTION

Figure 1:
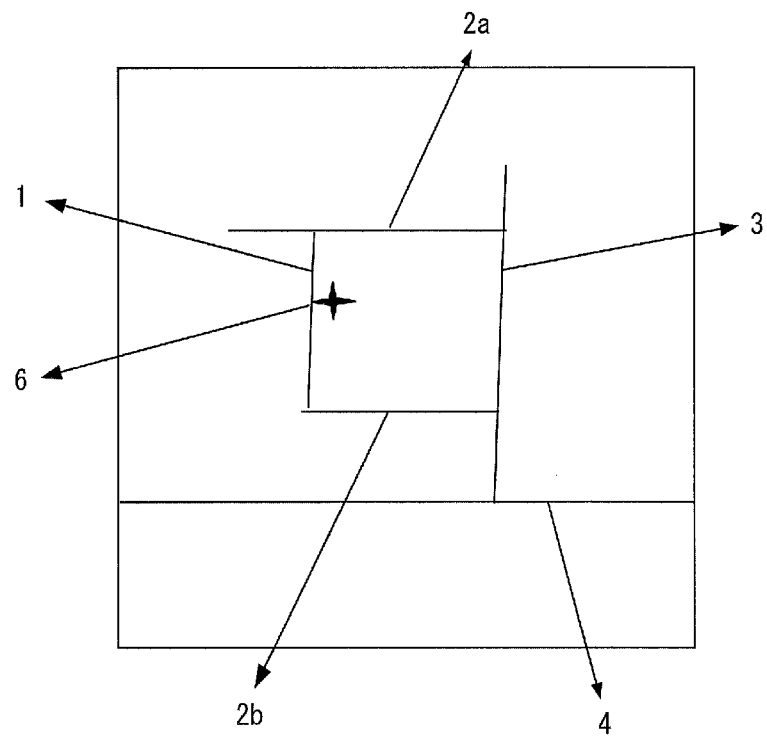
FIG. 1 is an example of displaying in the present invention.
Figure 2:
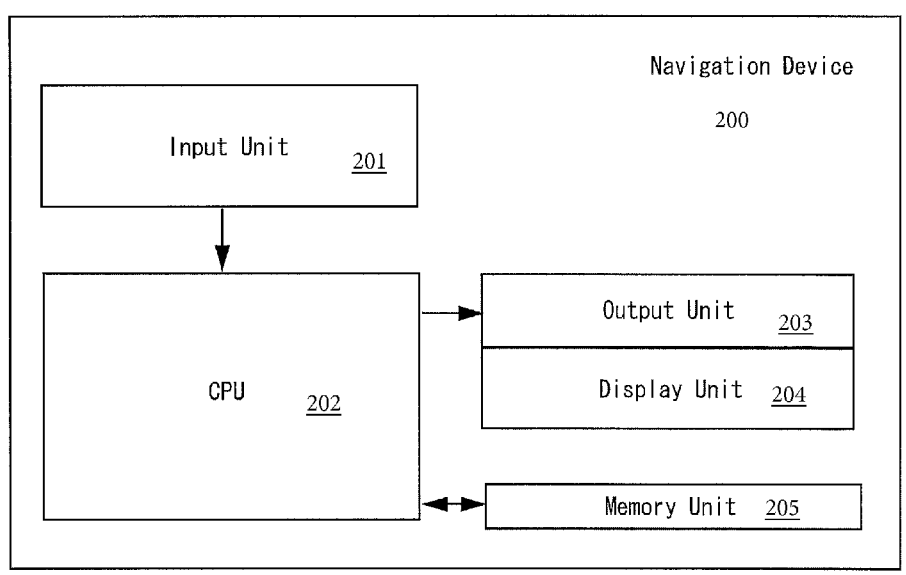
FIG. 2 is a block diagram that illustrates an example navigation device for presenting the display of FIG. 1.

Below, an embodiment of the present invention will be explained based on the attached drawing. In FIG. 1, reference number 1 indicates an end line 1, reference numbers 2a and 2b indicate end line 2, reference number 3 indicates an end line 3, reference number 4 indicates an end line 4, and reference number 6 indicates a target point. As shown in FIG. 2 for navigation device 200, an input unit 201 comprises a means for receiving information on travel, such as a current position, target and mobile object; a memory unit 205 comprises a means for storing data relating to the travel, and a program and process, etc. necessary for operation; a CPU 202 comprises a means for performing processing for necessary searching, calculation, outputting and displaying; and an output unit 203 comprises a means for outputting and displaying information with sounds and images. A display unit 204 comprises a means for displaying sounds and images.

A locator detects a current position from satellite radio waves, a sensor or beacon, etc. In an example of using a portable device, a communication function is provided for transmitting with a center.

Data and a program, etc. necessary for the center may be provided and they can be also transmitted to the portable device via communication after performing necessary processing.

Information on the target is obtained from the Internet, magazines, brochures, tour guides and other variety of means and methods, input and set.

When information on the target, mobile object and other information on the travel is input, end lines are searched, calculated, output and displayed.

A path reaching to the target is indicated as an end line 1, a path reaching to the end line 1 as an end line 2, a path reaching to the end line 2 as an end line 3 and, sequentially, a path reaching to an end line 'n' is indicated as an end line 'n+1'.

In the case where the target is an area, not a point, or a point in an area, there will be two or more end lines 1 in some cases.

For some target point, an end line thereof is stored as data in a memory unit and when the target point is set as a target, the data is retrieved together with the target point and the end line is output to be displayed.

Alternatively, when a target is set, searching is done by searching a path on which the target is located and indicating it as an end line 1, indicating a path having a crossing with the end line 1 as an end line 2, indicating a path having a crossing with the end line 2 as an end line 3 and indicating a path having a crossing with an end line 'n' as an end line 'n+1' sequentially in this way.

When the current position moves to other end line 'n' and 'n' is a smaller number than before, it means that the position became closer to the target. Therefore, to notify the user of this, it is preferable to display it emphatically by changing colors and types of the end lines or a background color, or notifying by a character, signal, sign or voice guidance, etc. By displaying a part of the end lines differently or displaying a part of an end line differently, strain on the user trying to recognize it can be reduced. To cite an example, when the current position is on the end line 1, the situation of approaching to the target can be notified by a background color, voice or sound, etc. as the current position gets closer to the target.

A part of the end line may be emphasized by displaying differently.

On the contrary, when 'n' becomes larger, it means that the possibility of reaching the target is lowered, therefore, it should be displayed in an appropriate emphasized way.

Alternatively, an end line 'n' where the current position is and end lines having larger numbers than 'n' may be displayed in an indistinctive way, while end lines with smaller numbers than 'n' may be displayed emphatically with images and sounds.

When one path has different numbers 'n' at the same time, it can be chosen arbitrarily which number, the upper number or lower number, to be prioritized for display.

For example, 'n' is to be displayed and 'n+1' is not displayed, or the opposite example may be mentioned.

When searching an end line 'n+1' from an end line 'n', a condition may be set for a rank of path such that a width of the road has to be equal or wider.

When a path having a crossing with an end of the end line 'n' is 'n+1', it is likely that a road width of 'n+1' is equal or wider than that of 'n' in general.

In this example, when road data is provided as link data, a link group which shares an end point of a link sequence of the end line 'n' as crossing is considered as 'n+1' and searching may be done within the link data based thereon.

Generally, it is preferable that end lines of fixed targets in particular are stored as data in the memory unit.

In an area with lots of regulations on direction or irregular-shaped paths, targets and end lines are stored together as data in the memory unit in advance.

An area of displaying end lines may be decided arbitrarily according to a density of paths and regulations on direction in the area.

When end lines overlap, they may be displayed in an imposed way or only 'n+1' or 'n' may be displayed. Alternatively, only 'n+1' may be displayed, but it may be changed to display only 'n' when the mobile object moved to 'n'.

Also, an end line on which the current position is may be displayed emphatically.

There are other combinations, and high-order end lines and low-order end lines are treated in the same way.

When there are a plurality of end lines 'n' displayed and a mobile object moves in on one of the lines, if other end lines 'n' are not shown, the display can be simplified. In this example, lines of 'n+1' or larger are not displayed. When the mobile object got out of the end line, all the end lines are displayed.

For example, when the mobile object moved in on one of end lines 4, other end lines 4 are erased.

Alternatively, following regulations on direction, the end line 1 may be displayed in the regulation direction up to the target, and, on other end lines, an end line 'n+1' may be displayed in the regulation direction up to an intersection point with an end line 'n'.

When the mobile object moves in on an end line 'n' from an end line 'n+1', the end line 'n+1' is preferably all erased so as to simplify the display.

As to end lines, by displaying only an end line 'n' where the current position is and not showing other end lines 'n' so as to display with end lines with smaller numbers than 'n', only significant end lines for reaching the target and the end line of the current position are displayed, and visibility of the display is improved thereby.

End lines with larger numbers than an end line 'n' are not displayed or displayed with an unnoticeable color or type of line.

When the mobile object moves in on an end line with a larger number than 'n', logically the same processing is performed.

There may be a large number of combinations in reaching to the end line '1' from an end line 'n' in some cases.

In that case, some combinations may be selectively displayed to simplify the display.

In an area with complex-shaped paths and lots of regulations on direction, reaching to a target point is hard and it is not favorable as a location for a commercial facility.

When setting the facility as a target point, registering end lines thereof as data, adding a navigation code and notifying visitors by putting it down on business cards, brochures, on the Internet or by some other means of giving notification, it can be used as a new type of advertisement having an invitation function.

It can be streamlined by providing a communication function to a portable device or in-vehicle device and distributing a navigation code from the center or, as to the registered facilities, it can be streamlined by sending information relating to a registered facility to the center and distributing a target point and end lines thereof.

It is preferable that a color and type of line of each end line are made different and the line display including the background is designed ingeniously for each stage according to move of the mobile object so as to improve discrimination and entertaining variation.

By using a background color, colors and types of lines, sound effects and some characters, etc., it is possible to make it seem like playing a game, so that it becomes easier for the driver to recognize that the possibility of reaching to the target point is getting higher as the number 'n' becomes smaller.

Displaying in combination of two dimension and three dimension, emphasis and erasure of lines, etc. may be devised. It is preferable to design the presentation in accordance with a range and scale reduction of a displayed area. Also, expressions according to attributes of roads, such as a width, regulation and management, may be added.

Display and erasure of each of the end lines 1 to 'n' may be expressed as required by the user, as well.

INDUSTRIAL APPLICABILITY

The navigation device can be used by all mobile objects and applied for in-vehicle use in addition to portable use, by which it is possible to reach a target point safely and efficiently.

The invention claimed is:

1. A navigation device to be installed in a mobile object, comprising an input unit, CPU, memory unit, output unit and display unit, wherein a path reaching to a target point is an end line 1, a path reaching to the end line 1 is an end line 2 and a path reaching to an end line 'n' is an end line 'n+1' sequentially, wherein at least one end line 'n' comprises a plurality of paths;

the input unit comprises a means for setting information on a target;

the CPU comprises a means for retrieving the end lines from the memory unit when the target is set and a searching and calculating means for calculation;

the input unit comprises a means for receiving as an input a current position;

the CPU comprises a processing means for changing display relating to the end lines when the current position changes; and the output unit and the display unit comprise a means for outputting and displaying sounds and images based on the changing display relating to the end lines.

\* \* \* \* \*